July 9, 1929.  C. C. BLAND  1,720,621
FRESH AIR BED
Filed Dec. 19, 1927  2 Sheets-Sheet 1
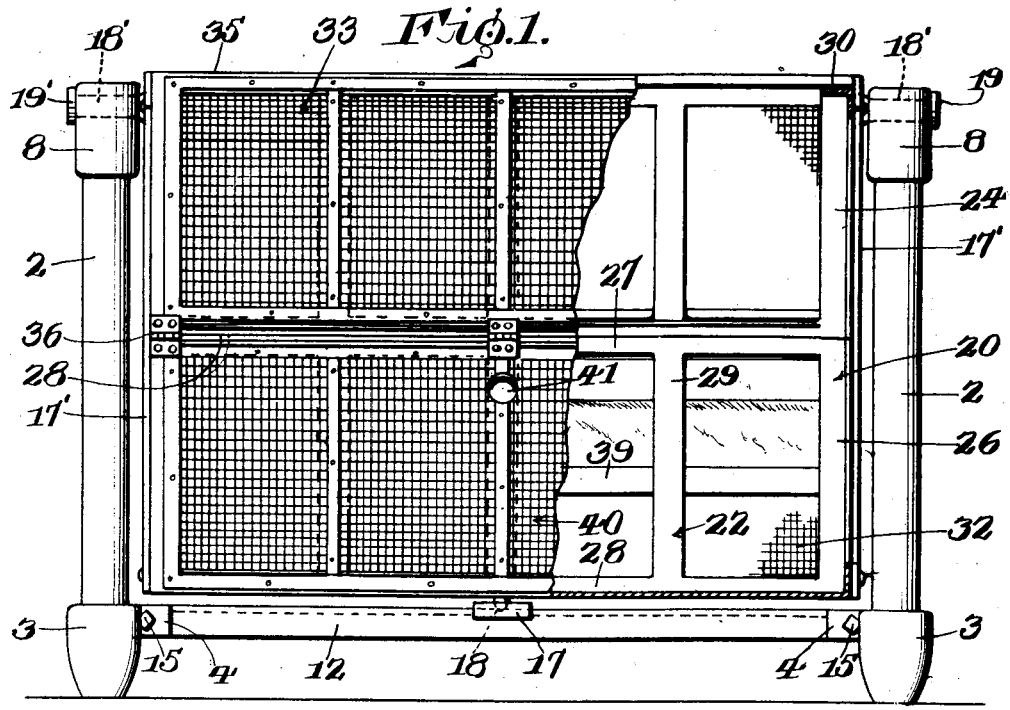
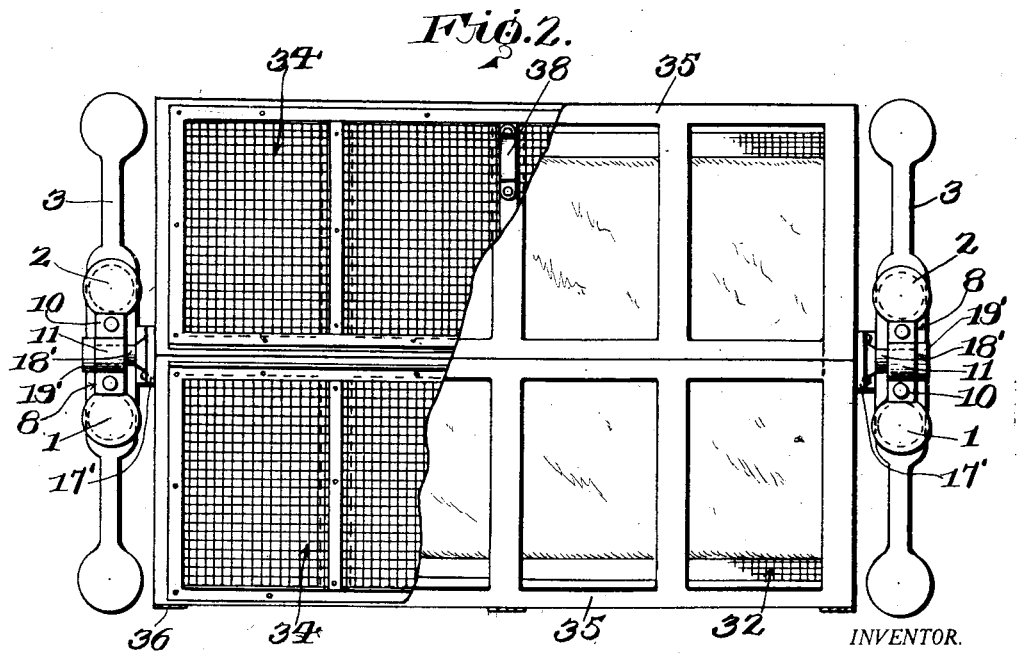
INVENTOR.
Charles C. Bland,
BY
Geo. P. Kimmel
ATTORNEY.

July 9, 1929.  C. C. BLAND  1,720,621
FRESH AIR BED
Filed Dec. 19, 1927   2 Sheets-Sheet 2
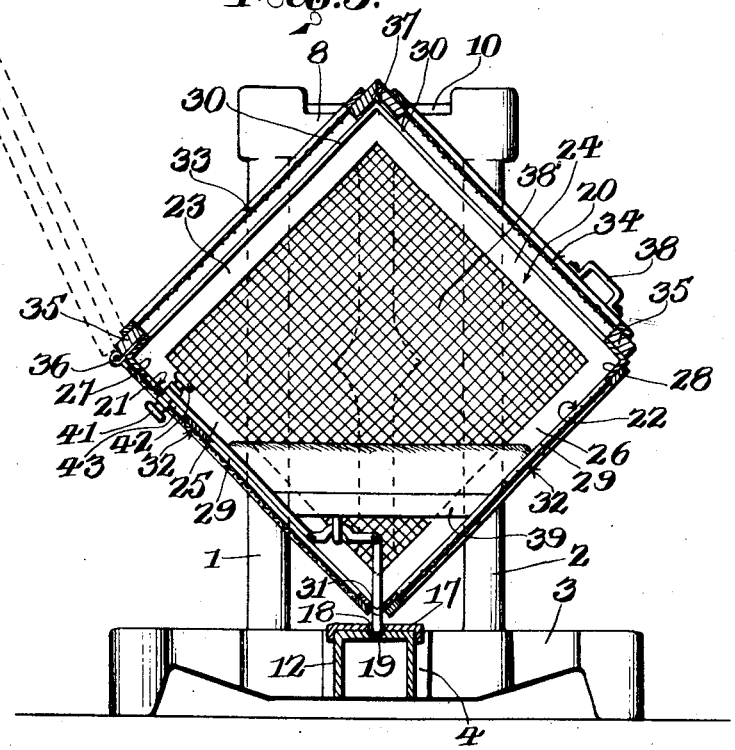
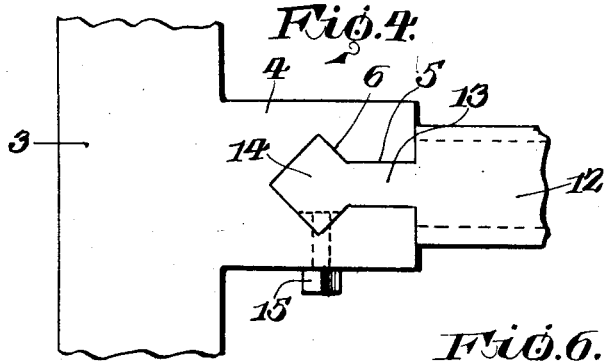
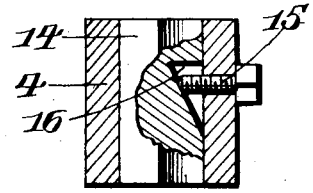
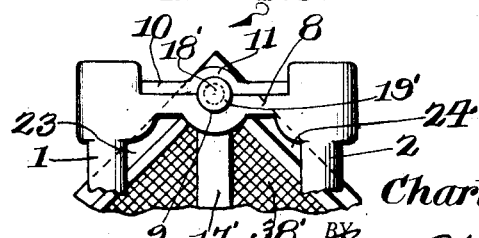
INVENTOR.
Charles C. Bland,
BY
Geo. P. Kimmel
ATTORNEY.

Patented July 9, 1929.

1,720,621

UNITED STATES PATENT OFFICE.

CHARLES C. BLAND, OF STEGER, ILLINOIS.

FRESH-AIR BED.

Application filed December 19, 1927. Serial No. 241,147.

This invention relates to a fresh air bed and has for its object to provide, in a manner as hereinafter set forth, a bed of such class including a foraminous supporting structure for the bed bottom acting to protect an occupant thereof from insects, and with said structure constructed and arranged whereby the top thereof can be swung from over the occupant when desired.
A further object of the invention is to provide, in a manner as hereinafter set forth, a fresh air bed including an oscillatory supporting structure for a bed bottom, and with such structure constituting a protecting enclosure for the occupant.

A further object of the invention is to provide, in a manner as hereinafter set forth, a fresh air bed including an oscillatory supporting structure for a bed bottom, said structure being foraminous, and further to provide the bed with means operated interiorly or exteriorly thereof for latching the oscillatory supporting structure stationary when desired.
Further objects of the invention are to provide, in a manner as hereinafter set forth, a fresh air bed of the oscillatory type which is simple in its construction and arrangement, strong, durable, compact, thoroughly efficient in its use, permitting of convenient ingress and egress with respect thereto, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation, partly broken away, of a fresh air bed in accordance with this invention.
Figure 2 is a fragmentary view thereof in top plan.

Figure 3 is a cross sectional view of the bed and further illustrating in dotted lines the upper portion of the supporting structure for the bed bottom shifted to open position.

Figure 4 is a fragmentary view, in top plan of one of the foot pieces and the connecting rod between the foot pieces.

Figure 5 is a vertical sectional view illustrating a portion of a foot piece and an end of the connecting rod.

Figure 6 is a fragmentary view in end elevation.

A fresh air bed, in accordance with this invention. includes a pair of stationary end supports and as each thereof is of like construction, but one will be described, as the description of one will apply to the other. Each support includes a pair of spaced parallel standards 1, 2 secured at their lower ends to a foot piece 3 of a length to project laterally with respect to each of the standards. The foot piece 3 centrally of its inner side is formed with an inwardly extending right angularly disposed extension 4 having a lengthwise extending slot opening at the free end of the extension. The slot includes a rectangular portion 5 and a polygonal shaped portion 6, the latter being at the inner end of the slot. The standards 1, 2 at their upper ends are connected together by a cross head 8 provided centrally of its top with a groove 9 having the walls thereof constituting a bearing for a purpose to be presently referred to. Mounted upon the cross head 8 and secured therewith is a cap piece 10 provided centrally with an upstanding inverted semi-circular portion 11 which opposes the groove 9 and coacts with the latter for a purpose to be presently referred to.

The foot pieces are maintained in spaced relation, and coupled together by a connecting bar 12 formed at each end with a reduced extension 13 which terminates in a lozenge shaped head 14. An extension 13 and head 14 are adapted to be mounted in a slotted extension 4 and secured therewith by a binding screw 15 which has threaded engagement with the extension 4 and binds against the inclined wall of an inverted wedge shaped pocket 16 formed in one side of the head 14. See Figure 5. The combined extension 13 and head 14 correspond in contour to the shape of the slot in the extension 4 and snugly engage the walls of the slot. The binding screw 15 in connection with the inclined wall of the pockets 16 detachably secures the bar 12 to the foot pieces and also arrests the shifting of the bar 12 relative to the extensions 4. Secured to the upper face of the bar 12, centrally thereof, is a flanged plate 17, having an opening 18 which registers with a concavity or a pocket 19 formed in the top of the bar 12. The purpose of the opening 18 and concavity or pocket 19 will be presently referred to.

Suspended from the cross head 8 and capable of being oscillated is a supporting structure for and to enclose a bed bottom and which further provides means to protect the occupant of the bed from insects. The supporting structure is foraminous and includes hinged, foldable frame members. Each end of the body portion of the supporting structure is provided with a hanger member 17' having its upper end formed with an outwardly disposed laterally extending spindle 18' mounted in the groove 9 and retained in position by the cap piece 10. The cap piece 10 is detachably secured to the cross head. Each spindle at its outer end has an annular flange 19' to prevent the separation thereof from an end support when mounted in co-relation therewith. The supporting structure includes a body portion formed of a pair of lozenge shaped ends 20 and a pair of sides 21, 22 of less height than the ends. The sides 21, 22 are oppositely disposed relatively to each other and further outwardly inclined from the bottoms to the tops thereof. The sides 21, 22 extend from the bottom of the ends 20 to the transverse centers of the latter.

Each end is in the form of a frame and comprises an upper pair of oppositely disposed, downwardly extending and outwardly inclined bars 23, 24 and a pair of oppositely disposed, upwardly extending and outwardly inclined lower bars 25, 26. Each of said bars is of angle shaped cross section to provide an inwardly extending portion 30 throughout the length of each bar and with such portion disposed at the outer side of the latter. The bars 23, 24 are integral with each other at their upper ends and have their lower ends integral with the upper ends of the bars 25, 26. The lower ends of the bars 25, 26 are integral with each other.

Each side 21, 22 is in the form of a frame and includes a longitudinally extending top rail 27 of angle shape to form an upper and a lower inwardly extending portion. The portions of each top rail are oppositely inclined. The upper portion inclining upwardly and the lower portion inclining downwardly. Each side further includes a longitudinally extending and outwardly inclined bottom rail 28 arranged in the plane of the lower portion of the top rail of the side. The bottom rails 28 at their lower longitudinal edges are integral with each other. The bottom rails 28 and lower portions of the top rails 27 are integral with the inwardly extending portions of the bars 25, 26. The upper portions of the top rails 27 are integral with the lower ends of the inwardly extending portions of the bars 23, 24. The lower portion of each top rail is connected to a bottom rail by a series of spaced, flat rails 29 which are integral with the bottom rail and lower portion of the top rail. At the point of joinder of the bottom rails 29 a slot 30 is provided which is adapted to align with the opening 18. The inwardly extending portions 30 of the bars 23, 24 provide supports for a purpose to be presently referred to.

Secured to the outer faces of the sides 21, 22 and extending onto the portions 30 of the bars 25, 26 are stationary screens 32.

Normally supported by the portions 30 of the bars 23, 24 are oppositely disposed screens 33, 34 and each of the latter includes a frame 35. The screen 33, has the lower end of its frame 35 hinged, as at 36 to one of the upper rails 27. The frames 35 of the screens 33, 34 at the upper ends thereof are hinged together, as at 38. The lower end of the frame 35 of the screen 34 is not hinged to the other top rail 27.

A handle 38 is carried by the screen 34 to enable the convenient lifting of the screens 33, 34 from off of the end frames 20, and for folding them in the dotted line position as shown in Figure 3 whereby the top of the supporting structure will be open. Secured to the end frames 20 are screens 38'.

Arranged within the supporting structure and secured to the side members 21, 22 is a bed bottom 39.

Positioned within the supporting structure and operating through the slot 31 is a latching means 40 which coacts with the opening 18 and pocket 19 for detachably holding the supporting structure stationary. The latching means can be operated from within or exteriorly of the supporting structure, and for such purpose it is provided with a pair of knobs 41, 42, the former arranged within and the latter exteriorly of the side member 21. A slot 43 is provided to permit of the shifting of the knob 41. The latching means 40 is pivotally suspended from the bed bottom 39.

The screens act as a means to protect the occupant of the bed from insects. As the screens 33, 34 can be lifted off of the end frames convenient ingress and egress can be had.

It is thought the many advantages of a fresh air bed in accordance with this invention can be readily understood, and although the preferred construction is as illustrated and described, yet it will be understood that changes in the details of construction can be had which fall within the scope of the invention as claimed.

What I claim is:

1. In a fresh air bed an open top supporting structure formed of a pair of lozenge shaped ends and a pair of upstanding and outwardly inclined sides, each of said ends and sides in the form of a screen frame, said sides extending from the bottom of said ends to substantially the transverse medians of the latter and each having at the top thereof an inwardly extending, upwardly inclined portion providing a support, each of said ends above the support at the outer side formed with an inwardly extending portion providing a support, said sides integral with said ends, and a two-section, foldable screened closure for said open top, said closure normally seated on the supports formed on said sides and ends, the sections of said closure being hinged together at their tops, and one of the sections of the closure being hinged to one of said sides below the support at the top of the latter.

2. An open air bed comprising a pivotally suspended, open top supporting structure, a bed bottom arranged therein and supported thereby and spaced above the bottom of the structure, said structure having a slot in its bottom, a latching means pivotally suspended from the lower face of the bed bottom and extending through said slot for engagement with a socket to arrest pivoting of the supporting structure, and means carried by said structure for shifting said latching means to and from latching position.

3. In an open air bed, a bed bottom supporting structure having a slot in its bottom, a pair of pintles for pivotally suspending said structure, supporting means for the pintles and including a socket arranged below said structure, a latching means pivotally suspended from said bottom within said structure and extending through said slot for engagement with the socket to arrest pivoting movement of the structure, and means carried by said structure for shifting said latching means to and from latching engagement with respect to the socket.

In testimony whereof, I affix my signature hereto.

CHARLES C. BLAND.